US007253995B2

(12) United States Patent
Takahashi et al.

(10) Patent No.: US 7,253,995 B2
(45) Date of Patent: Aug. 7, 2007

(54) MAGNETIC HEAD AND MAGNETIC RECORDING/REPRODUCING DEVICE

(75) Inventors: Hiromasa Takahashi, Hachioji (JP); Kenchi Ito, Cambridge (GB)

(73) Assignee: Hitachi, Ltd., Tokyo (JP)

( * ) Notice: Subject to any disclaimer, the term of this patent is extended or adjusted under 35 U.S.C. 154(b) by 392 days.

(21) Appl. No.: 10/931,038

(22) Filed: Sep. 1, 2004

(65) Prior Publication Data

US 2005/0088787 A1 Apr. 28, 2005

(30) Foreign Application Priority Data

Oct. 28, 2003 (JP) ............................. 2003-368076

(51) Int. Cl.
*G11B 5/33* (2006.01)
*G11B 5/37* (2006.01)
*G11B 5/127* (2006.01)

(52) U.S. Cl. .................. 360/324.2; 360/324; 360/112; 360/322

(58) Field of Classification Search ............. 360/324.2, 360/324.12, 324.11, 324.1, 324, 322
See application file for complete search history.

(56) References Cited

U.S. PATENT DOCUMENTS

| 5,862,022 | A  | * | 1/1999  | Noguchi et al. .......... 360/324.2 |
| 6,338,899 | B1 |   | 1/2002  | Fukuzawa et al. |
| 6,597,548 | B1 | * | 7/2003  | Yamanaka et al. ........ 360/324.2 |
| 6,717,780 | B2 | * | 4/2004  | Hiramoto et al. ........ 360/324.2 |
| 6,829,121 | B2 | * | 12/2004 | Ikeda et al. .............. 428/811.5 |
| 6,995,960 | B2 | * | 2/2006  | Seyama et al. ......... 360/324.11 |
| 2001/0055184 | A1 | * | 12/2001 | Shimazawa et al. ..... 360/324.2 |
| 2003/0039062 | A1 | * | 2/2003 | Takahasahi ................ 360/112 |
| 2003/0104249 | A1 | * | 6/2003 | Okuno et al. ............. 428/693 |
| 2004/0264064 | A1 | * | 12/2004 | Sakakima .................. 360/322 |

FOREIGN PATENT DOCUMENTS

JP 03-154217 7/1991

(Continued)

OTHER PUBLICATIONS

M. Zaffalon and B. J. van Wees; Department of Applied Physics and Materials Science Centre, University of Groningen, Nijenborgh 4, 9747 AG Groningen, The Netherlands; published Oct. 28, 2003.*

(Continued)

*Primary Examiner*—Wayne Young
*Assistant Examiner*—Matthew G. Kayrish
(74) *Attorney, Agent, or Firm*—Antonelli, Terry, Stout & Kraus, LLP.

(57) ABSTRACT

A magnetic head includes a first electrode layer, a first ferromagnetic electrode pair that is electrically connected to the first electrode layer, and a second ferromagnetic electrode pair that intersects with a current which flows between the first ferromagnetic electrode pairs and is electrically connected with the first electrode layer. The current is allowed to flow between the first ferromagnetic electrode pair through the first electrode layer to accumulate spin electrons in the first electrode layer. A direction of magnetization of the fourth ferromagnetic electrode layer changes upon application of an external magnetic field. The second ferromagnetic electrode pair is so arranged as to intersect with the current that flows between the first ferromagnetic electrode pair, to increase a rate of change in the output signal of the in-plane spin accumulation effect.

14 Claims, 11 Drawing Sheets

FOREIGN PATENT DOCUMENTS

| | | |
|---|---|---|
| JP | 04-358310 | 12/1992 |
| JP | 07-221363 | 8/1995 |
| JP | 10-091925 | 4/1998 |
| JP | 11-509956 | 8/1999 |
| JP | 2000-137906 | 5/2000 |
| JP | 2001-168414 | 6/2001 |
| JP | 2001-230471 | 8/2001 |
| JP | 2002-190630 | 7/2002 |
| WO | WO 97/44781 | 11/1997 |

OTHER PUBLICATIONS

"Electrical detection of spin precession in a metallic mesoscopic spin valve", F.J. Jedema, et al, NATURE, vol. 416, pp. 713-716 (Apr. 2002).

"Spin accumulation in small ferromagnetic double-barrier junctions", Arne Brataas, et al, Physical Review B, vol. 59, No. 1, pp. 93-96 (Jan. 1999).

"Effects of spin accumulation in magnetic multilayers", C. Heide, Physical Review B, vol. 65, pp. 1-17 (2001).

"Zero-dimensional spin accumulation and spin dynamics in a mesoscopic metal island", M. Zaffalon and B.J. van Wees, Condmat, 0308395, (2003).

"Zero-dimensional spin accumulation and spin dynamics in a mesoscopic metal island", M. Zaffalon and B.J. van Wees, Phisical Review Letters. vol. 91, pp. 186601-1~4, (2003).

* cited by examiner (A-A' section structure diagram)

(B-B' section structure diagram)

(C-C' section structure diagram)

FIG. 5
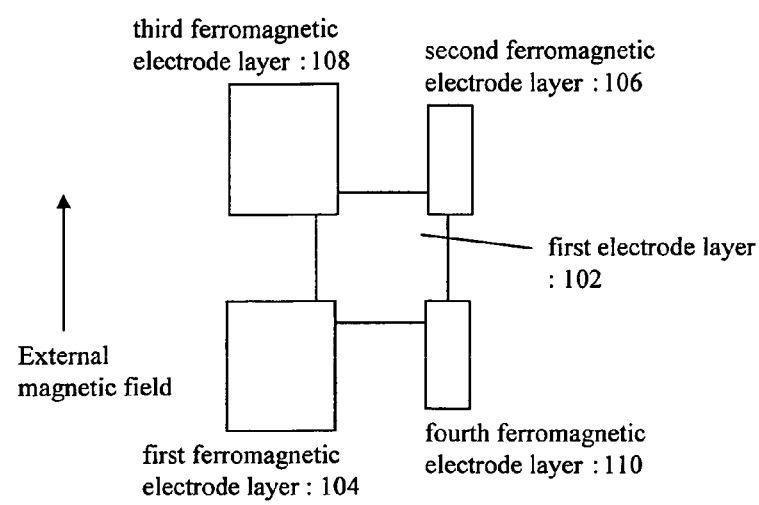
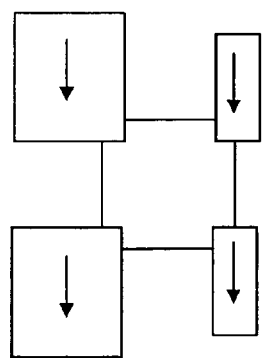
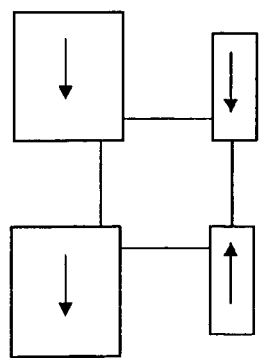
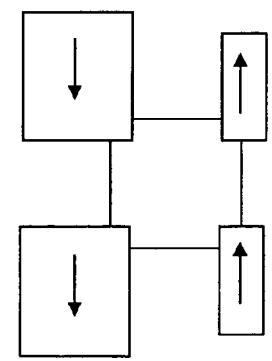
(A) H<Hc4, Hc2<Hc3, Hc1
(B) Hc4<H<Hc2<Hc3, Hc1
(C) Hc4, Hc2<H<Hc3, Hc1

(Structure when viewed from the top of the element)

(Section structure diagram)

(A-A' section structure diagram)

(A-A' section structure diagram)

FIG. 13
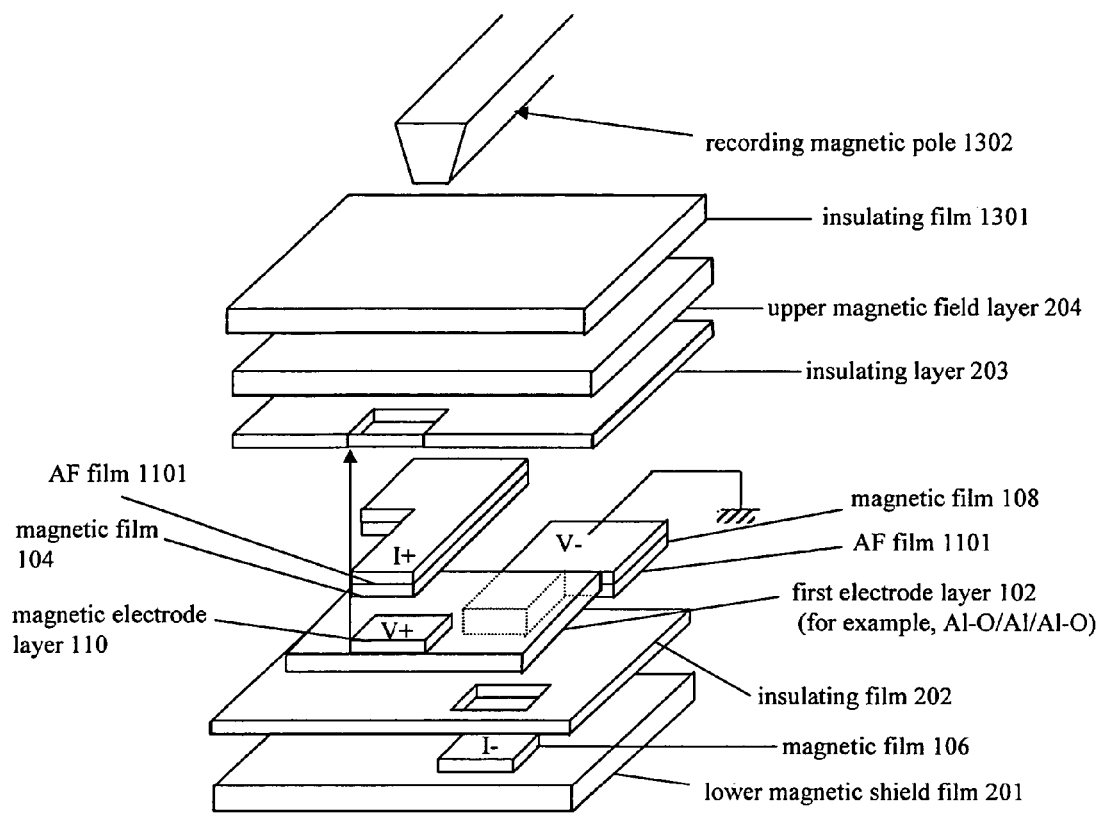
(Exploded view indicating the structure exploded by each layer, showing a recording head for reference)
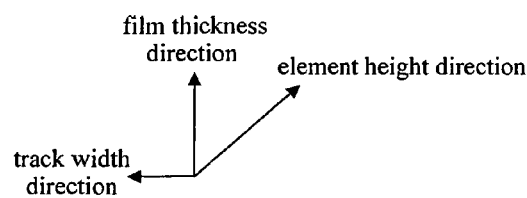

FIG. 14
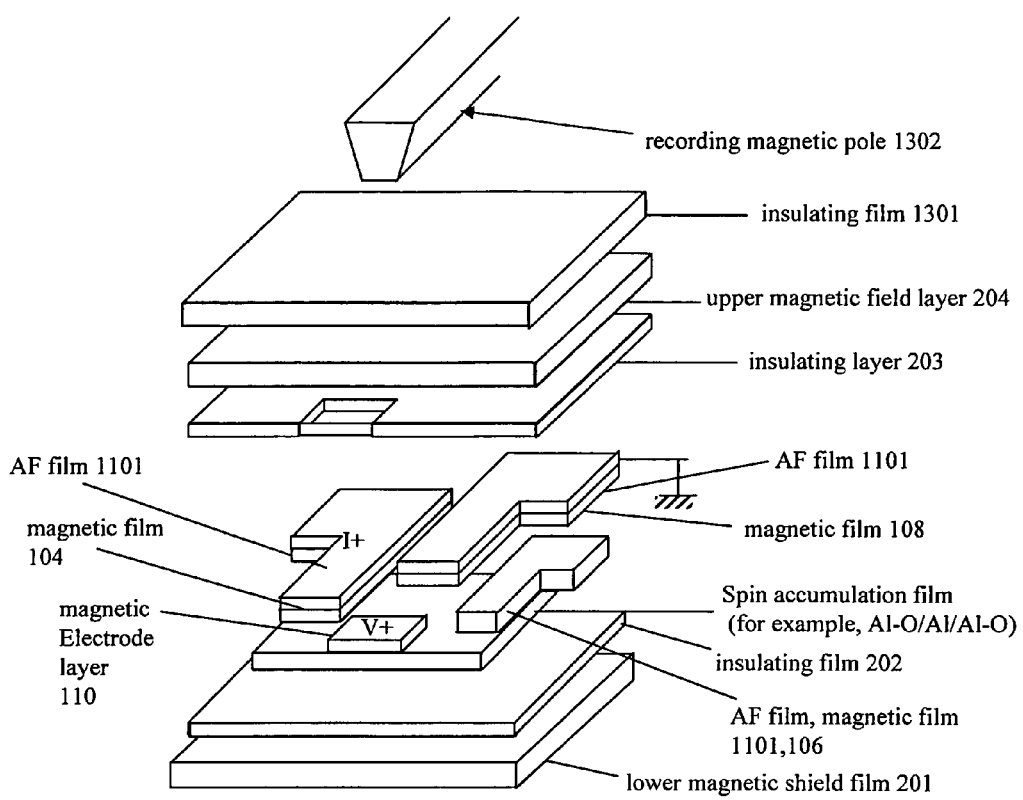
(Exploded view indicating the structure exploded by each layer, showing a recording head for reference)
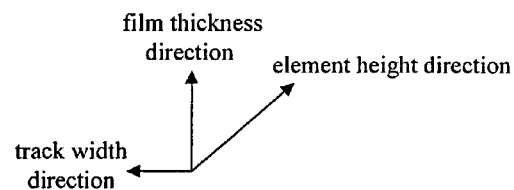

MAGNETIC HEAD AND MAGNETIC RECORDING/REPRODUCING DEVICE

CLAIM OF PRIORITY

The present application claims priority from Japanese application JP 2003-368076 filed on Oct. 28, 2003, the content of which is hereby incorporated by reference into this application.

FIELD OF THE INVENTION

The present invention relates to a magnetic head with a magneto-resistive effect element, and a magnetic recording/reproducing device equipment having the magnetic head.

BACKGROUND OF THE INVENTION

In a magnetic recording/reproducing device market, a demand has been made to improve a recording density at an annual rate of about 60%. Likewise, in a magnetic recording/reproducing head equipped in the magnetic recording/reproducing device, high performance has been demanded for both the characteristics of recording and reproduction.

It is important for a magnetic reproducing head to satisfy three technical challenges (1) to (3) stated below. (1) An improvement in a high sensitization technology, (2) an improvement in a narrowing technology of a track width, and (3) an improvement in a narrowing technology of a reproduction gap interval. In (1), when the recording density is 1 to 10 $(Gb/in^2)$ or less, the high recording density has been addressed choicely with an anisotropic magneto-resistive effect (AMR). When the recording density is higher, that is, 10 to 30 $(Gb/in^2)$, the high recording density has been addressed choicely with a giant magneto-resistive effect (GMR) by which a higher sensitivity can be obtained. Further, when the recording density is 20 to 70 $(Gb/in^2)$, the high recording density has been addressed choicely with an advance GMR effect called "a specular GMR" or "NOL-GMR". In the advance GMR, an insulating oxide layer that is high in the reflectivity of electrons (specular reflection) or the like is interposed between interfaces of a GMR structure, and a multiple reflection effect of electron spin is intended for an increase in the output.

JP-A H4-358310 discloses a structure that is called "spin valve" in a magnetic head using GMR. The magnetic head includes a magneto-resistive effect element that is made up of a fixed layer which is made of a magnetic material and whose magnetization is fixed to a specific direction by means of an antiferromagnetic layer. The magneto-resistive element is further made up of a non-magnetic thin film that is laminated on the fixed layer, and a free layer formed of a magnetic film which is laminated through the non-magnetic thin film. The magneto-resistive effect element permits a relative angle between the respective magnetizations of the fixed layer and the free layer to change an electric resistance.

In addition, JP-A 2000-137906, JP-A 2001-168414 and JP-A 2001-230471 disclose an MR improved structure of a CIP-GMR. In the MR improved structure, an oxide layer is inserted into at least one of the free layer side and the fixed layer side, the multiple reflection of electrons is developed by means of the specular reflection of the oxide layer. With this structure, a rate of change in the resistance is improved. Also, JP-A 2002-190630 discloses a CIP-GMR structure in which a half-metal layer is interposed between the free layer and an intermediate layer or between the intermediate layer and the fixed layer.

At present, the development of higher sensitization requires a higher sensitive reproducing system. In 70 to 150 $(Gb/in^2)$, a tunnel magneto-resistive effect (TMR) that is very high in MR ratio is favorable from the viewpoint of an improvement in the sensitivity. In case of an ultra-high recording density that exceeds 150 $(Gb/in^2)$, it is conceivable that GMR (CPP-GMR) of a system that allows a detection current to flow in a direction perpendicular to a film surface may be brought to the mainstream while making the use of such an advantage that an element impedance is small. TMR is disclosed as a basic technology in JP-A H3-154217 as well as JP-A H10-91925.

CIP-GMR suffers from a problem related to insulation between an element and shields when a distance between the shields is shortened in order to address the high recording density. On the contrary, CPP-GMR does not deal with the insulation characteristics as a serious problem, and it is presumable that CPP-GMR is hardly affected by a thermal element breakdown that is attributable to an electrostatic voltage and current or nonlinearization that is attributable to a magnetic field. CPP-GMR has been numerously reported, and typical CPP-GMR is disclosed in JP-A H11-509956 and JP-A H7-221363.

SUMMARY OF THE INVENTION

In the case of predicting the structure of a future magnetic reproducing element, a high sensitive magneto resistive sensor such as CPP-GMR (current perpendicular to plane GMR) in which a direction along which a current flows is identical with a direction of thickness of a film or TMR (tunnel magneto resistive effect) is effective. It is anticipated that the basic structure of those magneto resistive sensor is shifted to a structure where a sense current is allowed to flow to the CPP system. This is because those sensors are of a magnetic field sensor using a structure in which a sense current perpendicular to a film surface is allowed to flow.

The TMR element is of an element including a pair of magnetic materials that sandwich an insulating barrier. The TMR element has a structure in which a sensor current is allowed to flow in a direction of thickness of the element film. The TMR element is high in resistance because of electric conduction through the insulating barrier layer. Therefore, in the case where the TMR element is employed as a reproduction head or a magnetic field sensor, diverse noises are produced, and a signal to noise characteristic (S/N) is deteriorated. As a measure against the above drawback, a low-resistance-related research has been activated. A barrier layer using $Al_2O_3$ which is most commonly used now cannot negate the deterioration of an output which is associated with the film thinned for the purpose of reducing the resistance. As a result, a reduction in the resistance is not advanced. A new material is actively searched. However, in the existing circumstances, there is no solution that overcomes such a serious problem that the element resistance becomes larger in proportion to the element area when the element area is reduced.

On the other hand, CPP-GMR has a sensor portion of a GMR structure, and performs electric conduction in a direction of thickness of the thin film. Because a current path of CPP-GMR is shorter than that of CIP-GMR, when the conventional GMR film is applied, an element having an area of 0.25 $\mu m^2$ is about 0.3Ω in element resistance, and 2% in ΔR/R. For that reason, ΔAR is about 1.5 mΩ which is smaller by about one digit than an output value necessary to apply the conventional GMR film to a magnetic reproducing element of, for example, 200 $Gb/in^2$.

In a head of 150 to 200 Gb/in$^2$, an insulating layer having pin holes that are called "CCP (current confined pass)" is inserted between magnetic multilayer films so as to confine a current. With this structure, an apparent element area is reduced to improve the resistance and the output. Actually, the downsized element makes it possible to increase the resistance R as well as ΔR. However, a reproducing head of 500 Gb/in$^2$ or more is required to decrease the element resistance and increase the MR ratio. In this case, since the element area is in turn reduced, and the resistance is increased, the area resistance AR is required to be decreased. Also, in the CPP-GMR structure using CCP and the conventional CPP-GMR structure, there is no means for increasing ΔR/R while realizing the reduction in the area resistance AR. The future significant challenges are to reduce a gap length Gs (between-shield distance) in order to enhance the resolution as with the output and to reduce an influence of the electric capacity of the element that is a factor of the element resistance restriction. The existing CPP-GMR is not easy to solve the above problem and is required to provide a new element structure.

In recent years, research and device development which are pertained to the mutual interaction of a current attributable to spin polarization have been activated. There has been actually proved such a phenomenon that a spin current obtained by the polarization of spin polarizability conducts over a long distance of 100 nm or longer, and a phenomenon where magnetic interaction is developed. For example, see a document of F. J. Jedema et al., "Electrical detection of spin precession in a metallic mesoscopic spin valve", NATURE, Vol. 416, pp. 713-716 (April 2002). In the document, Co thin lines different in size and Al thin lines orthogonal to the Co thin line are prepared, and a structure in which an alumina barrier layer is disposed at a place where each of the Co thin lines intersects with each of the Al thin lines. In this structure, a current is permitted to flow from a thicker Co line toward an Al line, and a magnetic field is applied to the film. As a result, a potential difference that depends on the magnetic field is developed between another Co line and another Al line into which no current flows. The magnetic interaction has been confirmed although an interval between the thin lines exceeds 500 nm.

This phenomenon results from an effect called "spin accumulation" where spin polarized electrons are accumulated on interface portions of the Al thin lines, and is produced by distributing the accumulated spin polarized electrons over the wide areas of the thin lines. This is conceptually understood as typically disclosed in, for example, a document of "Physical Review B, Vol. 59, No. 1, pp.93-97", and a literature of "Physical Review B, Vol. 65, 054401, pp. 1-17". An element using the spin accumulation effect has a feature that when two magnetic materials different in coercive force with respect to an external magnetic field are provided, a change in the potential of one magnetic material to a conductive material is outputted. In the structure of Jedema et al, the magnetic materials are simple Co and connected by Al. An output associated with a change in magnetic field can be obtained at room temperature in this structure, likewise. In this structure, ΔV/V of the output is very as small as about 1%.

In recent years, in a document of "Condmat, 0308395, 2003 (M. Zaffalon et al.)", there is disclosed a film in which four terminals each formed of a Co thin line is brought in contact with an Al film that is about 500 nm in the length of each side through an $Al_2O_3$ insulating film. This film obtains a high signal that greatly exceeds the signal reported by Jedema et al in correspondence with a magnetization state of the Co thin lines and a direction along which the current flows. This results from reducing the size of the nonmagnetic film to the degree of a spin diffusion length, and using ferromagnetic electrodes at both of input and output sides to enhance the spin accumulation effect in the nonmagnetic film.

In order to apply the above structure high in the spin accumulation effect to the reproducing head technology, it is necessary to study the arrangement of the ferromagnetic film, the magnetic characteristics, the conditions of a magnetization state which are appropriate as the reproducing structure, the structure of wirings, the structure of the film, and the materials. In addition, the conditions for enhancing the output are required to be more optimized from the viewpoint of the material structure and from the viewpoint of the element structure. It is important to apply a material high in the spin polarizability to the magnetic material. Also, it is important to use a material which is Al, Cu or longer in the mean free path of the spin electrons than Al and Cu, or a material having a function of a d-electron conductor. Further, it is important to make a current path and a voltage change substantially orthogonal to each other within a plane and within a three-dimensional film structure, and to make distances between two output terminals and a current terminal identical with each other.

The present invention has been made to solve the above problems, and therefore an object of the present invention is to provide a magnetic head comprising a first electrode layer, a first ferromagnetic electrode pair that is electrically connected to the first electrode layer, and a second ferromagnetic electrode pair that intersects with a current which flows between the first ferromagnetic electrode pairs and is electrically connected with the first electrode layer. In the structure, the current is allowed to flow between the first ferromagnetic electrode pair through the first electrode layer to accumulate spin electrons in the first electrode layer. Also, a direction of magnetization of the fourth ferromagnetic electrode layer changes upon application of an external magnetic field.

With the above structure in which the second ferromagnetic electrode pair is so arranged as to intersect with the current that flows between the first ferromagnetic electrode pair, there can be provided a magnetic head that increases a rate of change in the output signal of the in-plane spin accumulation effect and increases the output more than the conventional magnetic head.

According to the present invention, there can be obtained a magnetic resistance change type magnetic reproducing head which facilitates the adjustment of an element resistance more than the conventional art, which is extremely high in the magnetic resistance change rate, which is effective in the high resolution, and which is large in the output. Moreover, the magnetic head can be used in combination with a magnetic recording medium having a surface recording density that exceeds 500 (Gb/in$^2$).

BRIEF DESCRIPTION OF THE DRAWINGS

These and other objects, features and advantages of the present invention will become more apparent upon consideration of the following description of the preferred embodiments of the present invention taken in conjunction with the accompanying drawings.

FIG. 5 is an explanatory diagram of a magnetization change mechanism of a ferromagnetic electrode film according to the present invention;

FIG. 13 is a schematic diagram showing a representative structure of a reproducing head structure where the respective layers are exploded;

FIG. 14 is a schematic diagram showing a representative structure of a reproducing head structure where the respective layers are exploded;

DETAILED DESCRIPTION OF THE PREFERRED EMBODIMENTS

Now, a description will be given in more detail of preferred embodiments of the present invention with reference to the accompanying drawings.

A magnetic head according to the present invention includes a first electrode layer, and a first ferromagnetic electrode pair having a first ferromagnetic electrode layer that is stacked on one end of the first electrode layer through a first insulating layer, and a second ferromagnetic electrode layer that is stacked on the other end of the first electrode layer through a second insulating layer. The magnetic head according to the present invention also includes a second ferromagnetic electrode pair having a third ferromagnetic electrode layer (fixed layer) that is stacked on one end of the first electrode layer through a third insulating layer, and a fourth ferromagnetic electrode layer (free layer) that is stacked on one end of the first electrode layer through a fourth insulating layer. In this structure, the second ferromagnetic electrode pair is so arranged so as to intersect with a current that flows between the first ferromagnetic electrode pair.

More specifically, for example, the second ferromagnetic electrode pair has the third ferromagnetic electrode layer that is stacked on one end of the first electrode layer, which is different from portions of the first electrode layer which are electrically connected with the first and second ferromagnetic electrode layers, through a third insulating layer, and the fourth ferromagnetic electrode layer that is stacked through a fourth insulating layer on the other end of the first electrode layer, which is electrically connected with the third ferromagnetic electrode layer. In the structure, a current is allowed to flow between the first ferromagnetic electrode pair through the first electrode layer to accumulate spin electrons in the first electrode layer. Moreover, a direction of magnetization of the fourth ferromagnetic electrode layer changes upon application of an external magnetic field.

Figure 1:
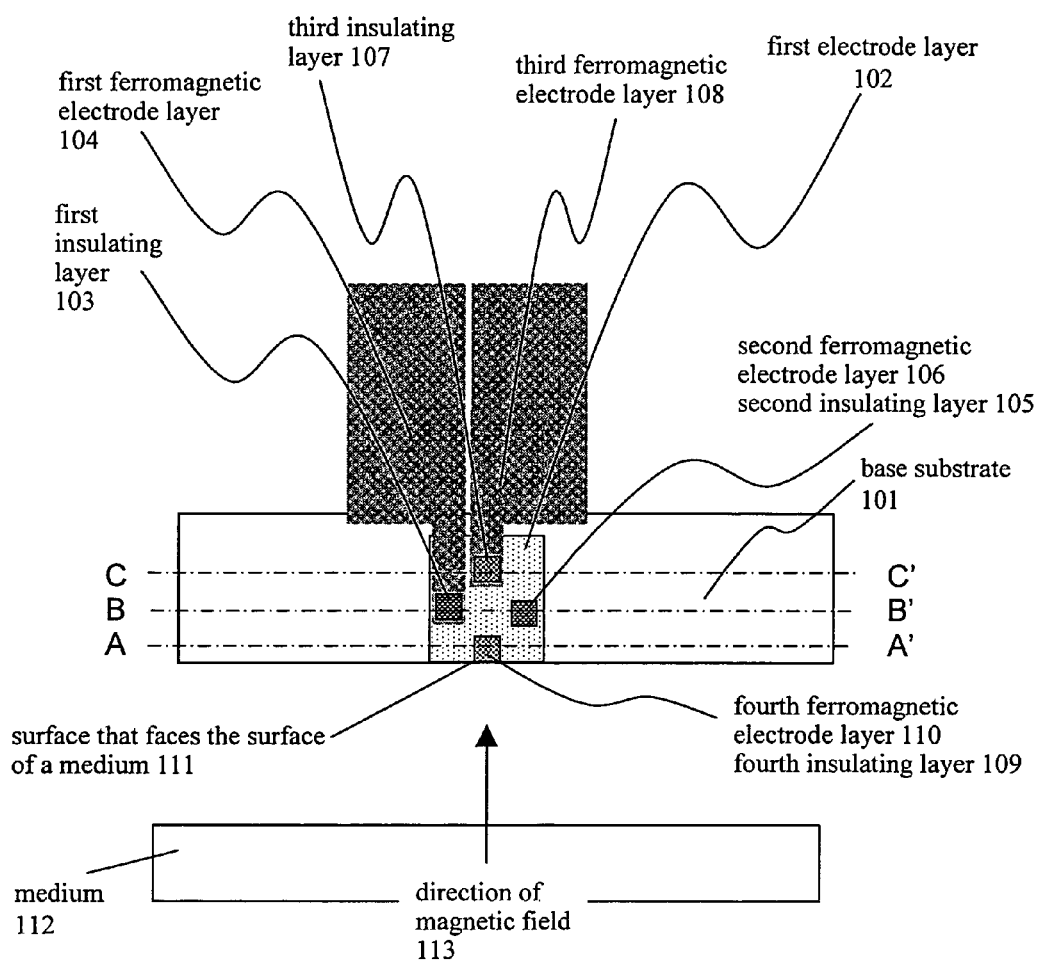
FIG. 1 is a view of a magnetic reproducing head element structure according to the present invention, taken from above of a film.

FIG. 1 is a diagram of a magnetic reproducing head according to the present invention, viewed from above of an element film. A first electrode layer 102 is formed on a base substrate 101 formed of a substrate and a ground material. A second ferromagnetic electrode layer 106 is formed on the first electrode 102 through a second insulating layer 105. A third ferromagnetic electrode layer 108 is formed on the first electrode 102 through a third insulating layer 107. A fourth ferromagnetic electrode layer 110 is formed on the first electrode 102 through a fourth insulating layer 109. The fourth ferromagnetic electrode layer 110 is disposed in the vicinity of a surface 111 that faces a medium surface. The fourth ferromagnetic electrode layer 110 is exposed to the surface 111 that faces the surface of a medium 112, or formed through a protective film or the like. There is provided a magnetic shield structure of a sensor surrounding where a magnetic field 113 from the medium is applied to at least the fourth ferromagnetic electrode layer 110.

In this structure, for example, the first and third ferromagnetic electrode layers 104 and 108 have an electrode terminal structure outside the first electrode layer 102. Also, the fourth and second ferromagnetic electrode films 110 and 106 have an electrode terminal structure outside the first electrode layer 102. Also, the fourth and second ferromagnetic electrode films 110 and 106 are so structured as to be in contact with magnetic shield layers disposed above and below the fourth and second ferromagnetic electrode films 110 and 106, or to be in contact with low resistant electrode films which are in contact with the magnetic shield layers.

For example, a structure is made so that when a current flows into the second ferromagnetic electrode layer 106 from the first ferromagnetic electrode layer 104 (first ferromagnetic electrode pair), a voltage between the third ferromagnetic electrode layer 108 and the fourth ferromagnetic electrode layer 110 (second ferromagnetic electrode pair) is measured as an output signal. As a result, a structure is made so that the coercive force of the fourth magnetic electrode layer is made smallest as compared with the coercive forces of the fourth magnetic electrode layer, the third magnetic electrode layer and other electrode layers. With this structure, a direction of magnetization of at least the fourth magnetic electrode layer is changed by an external magnetic field.

Figure 2:
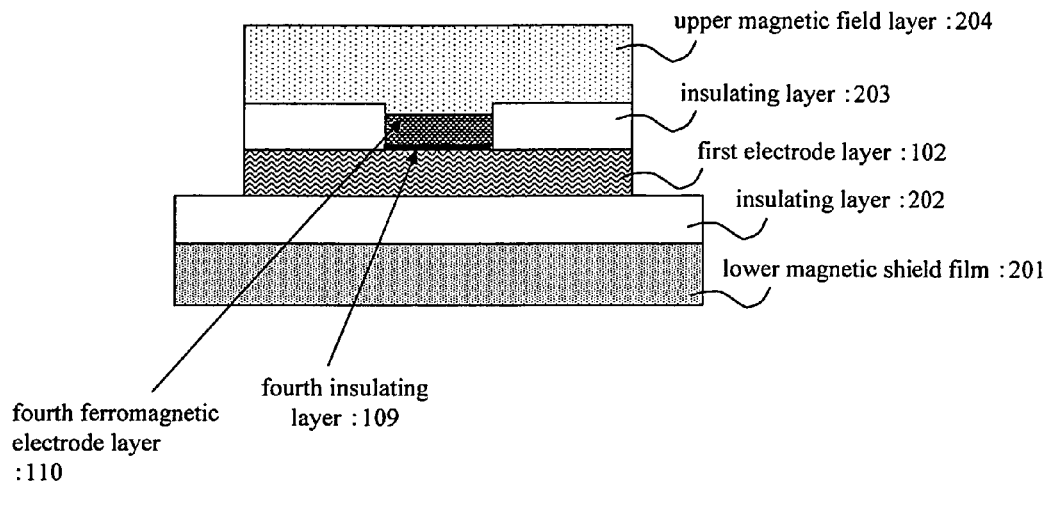
FIG. 2 is a diagram showing a basic structure (A-A' section) of a magneto resistive element portion according to the present invention.

FIG. 2 shows a cross-sectional view taken along a section A-A' of the first electrode layer 102 shown in FIG. 1. A lower magnetic shield film 201 has a structure also serving as an electrode film, which is in contact with a lower insulating film 202 and forms a part of the base substrate 101. The first electrode layer 102 is laminated on the lower insulating film 202. The fourth insulating film 109 and the fourth ferromagnetic electrode layer 110 are laminated on the first electrode layer 102 in the stated order. An insulating layer 203 is disposed on both sides of the fourth insulating layer 109 and the fourth ferromagnetic electrode layer 110, and only the fourth ferromagnetic electrode layer 110 is electrically in contact with the an upper magnetic field layer 204. Alternatively, the fourth ferromagnetic electrode layer 110 may be in contact with the lower magnetic shield layer 201 instead of the upper magnetic shield layer 204.

Figure 3:
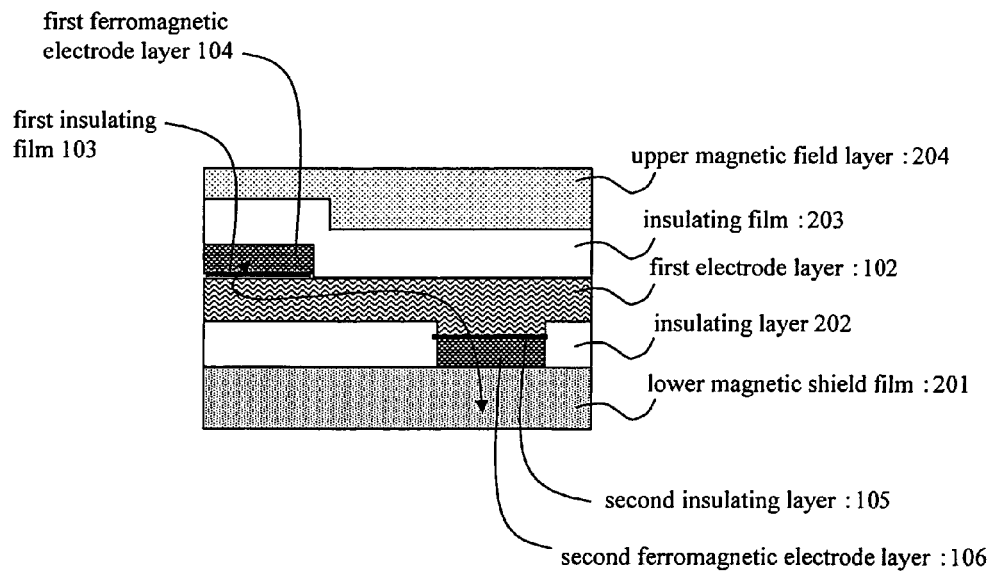
FIG. 3 is a diagram showing a basic structure (B-B' section) of a magneto resistive element portion according to the present invention.

FIG. 3 shows a cross-sectional view taken along a section B-B' of the first electrode layer 102 shown in FIG. 1. The second ferromagnetic electrode layer 106 is in contact with a part of the lower magnetic shield film 201, and is also in contact with the first electrode layer 102 through the second insulating layer 105. The lower insulating film 202 is disposed on both sides of the second ferromagnetic electrode layer 106 and the second insulating layer 105.

The first insulating layer 103 and the first ferromagnetic electrode layer are disposed on a part of the first electrode layer 102 which is not positioned over the second ferromagnetic electrode layer 106 and the second insulating layer 105. The insulating film 203 is disposed on both sides of the first insulating layer 103 and the first ferromagnetic electrode layer 104 and on the upper surface of the first ferromagnetic electrode layer 104. The upper magnetic shield 204 is disposed on the insulating film 203. Those two ferromagnetic electrode films are disposed above and below the first electrode, but can be disposed on the same surface of the first electrode. Those two ferromagnetic electrode films are mentioned as a first ferromagnetic electrode pair in the present specification, and a circuit for allowing a current to flow in the first ferromagnetic electrode pair is connected thereto.

Figure 4:
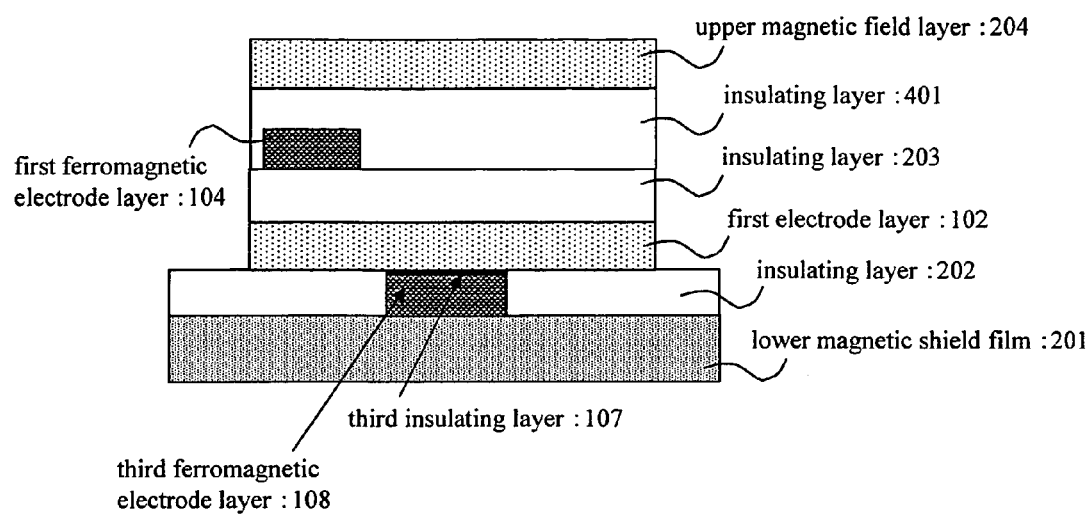
FIG. 4 is a diagram showing a basic structure (C-C' section) of a magneto resistive element portion according to the present invention.

FIG. 4 shows a cross-sectional view taken along a section C-C' of the first electrode layer 102 shown in FIG. 1. The lower magnetic shield film 201 has a structure also serving as the electrode film. The lower insulating film 202 is disposed on the lower magnetic shield film 201. The third ferromagnetic electrode layer 108 is in contact with the lower magnetic shield film 201 and also in contact with a part of the first electrode 102 through the third insulating layer 107. The insulating film 203 is disposed on the first electrode layer 102, and the first ferromagnetic electrode layer 104 is disposed on the insulating film 203. The insulating layer 401 is disposed on the insulating layer 203 and the first ferromagnetic electrode layer 104. The upper shield film 204 is disposed on the insulating layer 401.

The magnetizing action of the element structure represented by FIGS. 1 to 4 as described above will be described below. FIG. 5D is a schematic diagram showing a structure in which four ferromagnetic electrodes are disposed on the first electrode film.

FIGS. 5A to 5C show the directions of magnetization of the respective ferromagnetic electrode films in the case where a magnetic field is applied upward within a paper surface. In the figures, assuming that the coercive forces Hc of the first to fourth ferromagnetic electrode layers are $H_{c1}$, $H_{c2}$, $H_{c3}$ and $H_{c4}$, respectively, in case of $H_{c4}$, $H_{c2}<H_{c3}$, $H_{c1}$, a state in which an external supply magnetic field is lower than $H_{c4}$ and $H_{c2}$, and magnetizes a lower side that has been magnetized in advance is shown in FIG. 5A.

Also, a state in which an external supply magnetic field higher than $H_{c4}$ and $H_{c2}$, reveres a direction along which magnetization has been made in advance and magnetizes an upper side is shown in FIG. 5C.

Moreover, a case in which when Hc4 and Hc2 are values different from each other and Hc4 is smaller, a low magnetic field that is higher than $H_{c4}$ and lower than $H_{c2}$ is applied is shown in FIG. 5B.

It is easy to cause the above magnetizing action by giving the above coercive force state in advance. For example, the magnetization inverse magnetic field due to a coercive force difference or a combined magnetic field is shifted in a pseudo manner by changing the material and shape of the respective ferromagnetic electrode layers, and the antiferromagnetic film. As a result, the same state as that described here can be realized.

Figure 6:
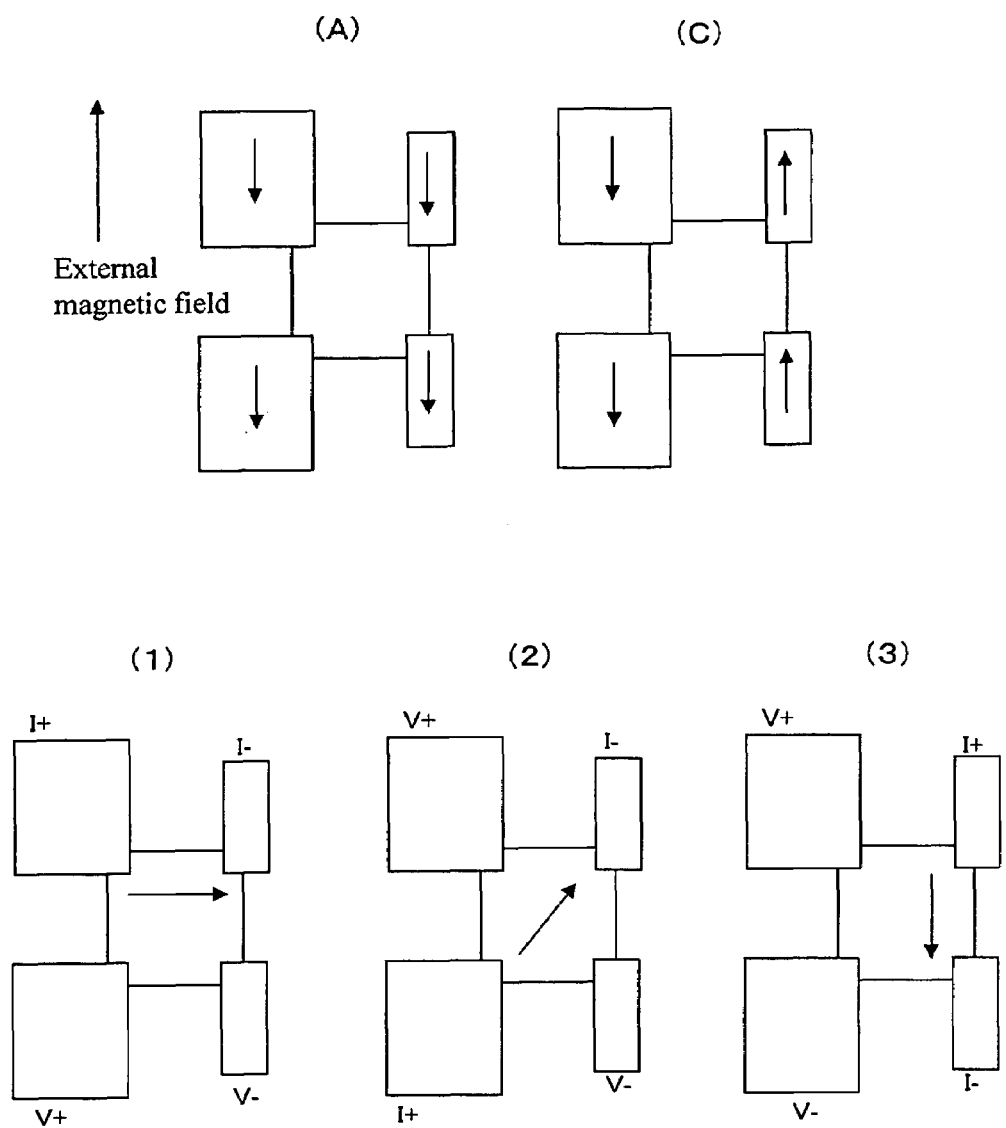
FIG. 6 is an explanatory diagram of a magnetization change mechanism of a ferromagnetic electrode film and a current supply system according to the present invention.

FIG. 6 is a diagram for explaining a current direction and a direction of a magnetic field in the case where FIGS. 5A and 5C show typical examples. FIGS. 6(1), 6(2) and 6(3) show the patterns of a current which are applicable in this case. It is assumed that the reverse of the current direction is regarded as the same direction. In the figures, I+ and I− indicate current terminals, and V+ and V− indicate voltage measurement terminals. In this example, in FIG. 6(1), the current terminals are arranged to be orthogonal to the magnetic field direction.

The magnetization states shown in FIGS. 6A and 6B are compared with each other. In FIG. 6A, the magnetization direction of the current terminal is in a parallel (P) state, and the magnetization direction of the voltage terminal is also in parallel (P). On the other hand, in FIG. 6B, the magnetization direction of the current terminal is in an anti-parallel state (AP), and the magnetization direction of the voltage terminal is also in anti-parallel (AP).

In this case, because the amount of accumulation of the spin current that is accumulated in the electrode film 102 is different between the P state and the AP state, an output voltage difference occurs between the voltage terminals. Because a change of voltage in a direction parallel with the current terminal is measured, a bias voltage is applied, and the voltage becomes a finite value even when the magnetic field is zero. Therefore, $\Delta V/V_0$ is about several tens %.

In FIG. 6(2), the current terminals are arranged at an angle 45° with respect to the direction of the magnetic field. Comparing the magnetization state shown in FIG. 6A with the magnetization state shown in FIG. 6B, FIG. 6A shows that the magnetization direction of the current terminal is in parallel (P), and the magnetization direction of the voltage terminal is also in parallel (P).

On the other hand, FIG. 6B shows that the magnetization direction of the current terminal is in anti-parallel (AP), and the magnetization direction of the voltage terminal is also in anti-parallel (AP). In this case, because the amount of accumulation of the spin current which is accumulated in the electrode film 102 is different between the P state and the AP state, an output voltage difference occurs between the voltage terminals.

Also, in the arrangement shown in the figures, those two voltage terminals are disposed at substantially the same distance from the current terminals. With this arrangement, an influence of the bias voltage is substantially eliminated, and the voltage output becomes substantially zero when the magnetic field is zero. The rate of change $\Delta V/V0$ approaches infinite in principle, and also becomes a high value that exceeds 1000% experimentally.

In FIG. 6(3), the current terminals are arranged in parallel with the direction of the magnetic field. Comparing the magnetization state shown in FIG. 6A with the magnetization state shown in FIG. 6B, FIG. 6A shows that the magnetization direction of the current terminal is in parallel (P), and the magnetization direction of the voltage terminal is also in parallel (P).

On the other hand, FIG. 6B shows that the magnetization direction of the current terminal is in anti-parallel (AP), and the magnetization direction of the voltage terminal is also in anti-parallel (AP). In this case, the amount of accumulation of the spin current which is accumulated in the electrode film 102 hardly changes because the P state and the AP state cannot be formed.

Accordingly, a difference of the output voltage hardly occurs between the voltage terminals, and the rate of change $\Delta V/V0$ which is attributable to the magnetic field becomes substantially zero in principle. The position shown in FIG. 6(3) as the electrode arrangement is excluded from the present invention.

Figure 7:
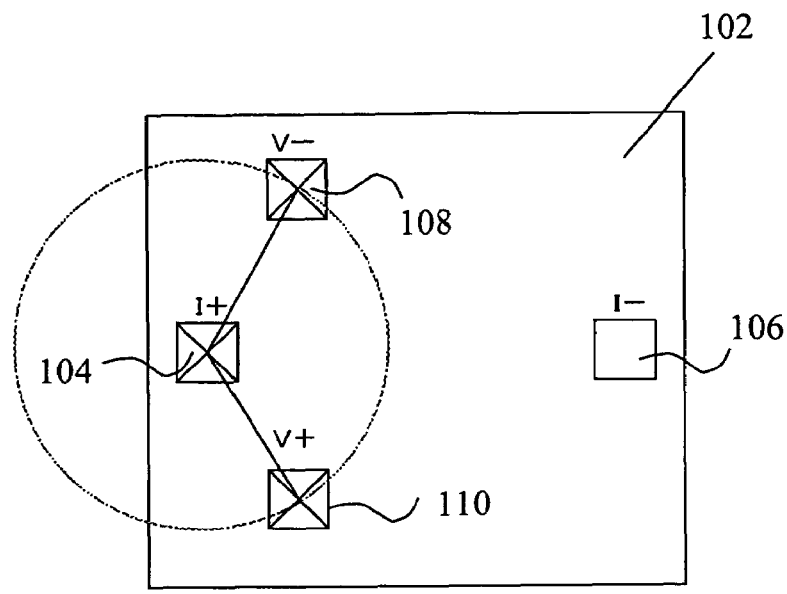
FIG. 7 is a diagram showing a basic structure of an electric circuit in a reproducing head according to the present invention.

In the case where the above arrangement of the electrodes is applied to the structure shown in FIG. 1, there are three ways (six ways) of positions at which those four ferromagnetic electrode films should be arranged on the first electrode, as shown in FIG. 7. That is, there is a case in which the four ferromagnetic electrode films are arranged on one surface, that is, the same surface of the first electrode film. There is another case in which two of the ferromagnetic electrode films are disposed on one surface of the first electrode film whereas the remaining two ferromagnetic electrode films are disposed on a rear surface of the first electrode film. There is still another case in which three ferromagnetic electrode films are disposed on one surface of the first electrode film whereas one ferromagnetic electrode film is disposed on the rear surface of the first electrode film. The arrangements of the current terminals and the voltage terminals are made as shown in the figure.

Figure 8:
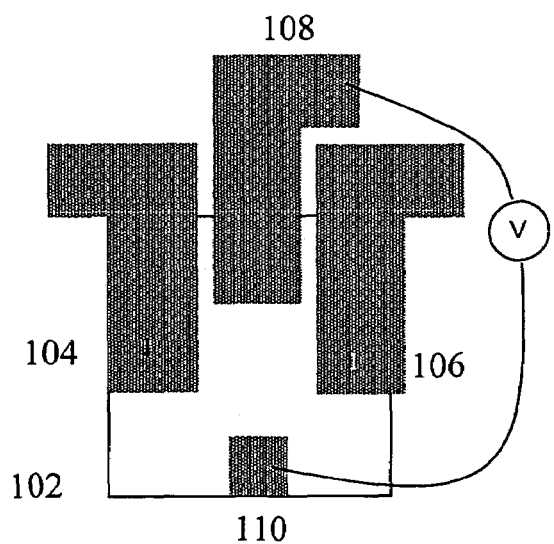
FIG. 8 is a diagram showing another structure (B-B' section) of a basic structure of the magneto resistive element portion according to the present invention.

For example, in the case where the four ferromagnetic electrode films are disposed on the same surface of the first electrode film, a structure shown in FIG. 8 is made, for example, when viewing the B-B' section of FIG. 1. This is a structure in which the first electrode layer is disposed on the lower shield and the insulating film. Also, the first and second ferromagnetic electrode layers are in contact with the first electrode layer through the first and second insulating films. In this structure, a current is supplied from the first and second insulating films and then flows into the first electrode layer.

Figure 9:
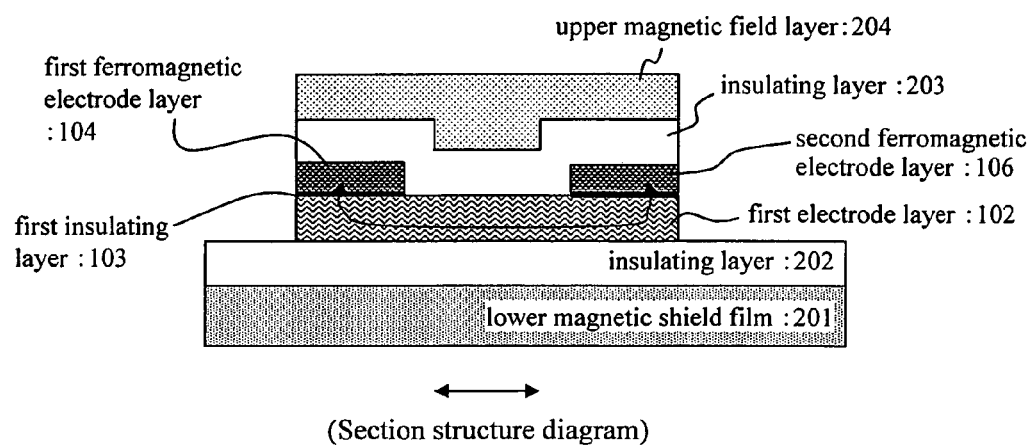
FIG. 9 is a diagram showing an optimum positional relationship of the ferromagnetic electrodes of a magnetic head on a first electrode layer according to the present invention.

It is effective that the distances between the third and fourth ferromagnetic electrodes and the first ferromagnetic electrode film are substantially identical with each other as shown in FIG. 9, as the particularly effective positions at which the third and fourth ferromagnetic electrodes should be arranged. This is one way in which an influence of a reduction in a change of the voltage $\Delta V/V$ is minimized as described above. The reduction in the change of the voltage is caused by generating a finite voltage change even when the magnetic field becomes zero when the bias electric field is applied to the voltage terminal depending on the arrangement of the electrodes in the current direction and the magnetic field direction.

Likewise, it is particularly effective that the distances of the third and fourth ferromagnetic electrodes from the second ferromagnetic electrode film are substantially identical with each other. Obviously, it is the most suitable manner to meet the following conditions in order to reduce the effect of the bias voltage. That is, the respective distances between the third and fourth ferromagnetic electrodes and the first and second ferromagnetic electrodes are substantially identical with those of the third and fourth ferromagnetic electrodes.

The first electrode layer 102 is made of nonmagnetic conductive metal of Cu, Au, Ag, Pt, Al, Pd, Ru, Ir or Ph, or a conductive compound mainly containing GaAs, Si, TiN, TiO or $ReO_3$.

Also, each of the first, second, third and fourth ferromagnetic electrode layers 104, 106, 108 and 110 is formed of a single layer film or a composite multiplayer film which are made of the following half-metal material:

a ferromagnetic metal of Co, Fe or Ni;

a ferromagnetic alloy mainly containing Co, Fe or Ni;

an oxide having a structure of $AB_2O_4$ represented by $Fe_3O_4$ where A is oxide containing at least one of Fe, Co and Zn, and B is oxide containing one of Fe, Co, Ni, Mn and Zn;

a compound of $CrO_2$, CrAs, CrSb or ZnO added with at least one component of Fe, Co, Ni, Cr and Mn which are transition metal;

a compound of GaN added with Mn; or a $C_2D_xE_{1-x}F$ type Heusler alloy represented by $Co_2MnGe$, $Co_2MnSb$, or $Co_2Cr_{0.6}Fe_{0.4}Al$ where C is at least one of Co, Cu and Ni, and D and E are one of Mn, Fe and Cr, respectively, and F contains at least one component of Al, Sb, Ge, Si, Ga and Sn.

Each of the first, second, third and fourth insulating layers 103, 105, 107 and 109 is formed of a single layer film or a composite multiplayer film which is made of at least one of $Al_2O_3$, AlN, $SiO_2$, $HfO_2$, $ZrO_3$, $Cr_2O_3$, MgO, $TiO_2$, and $SrTiO_3$.

Now, the mechanism of the magnetic head according to the present invention will be described below. The magnetic head according to the present invention is made up of a magneto resistive element using the accumulation effect of a spin current and a resistance change amplification film. The magneto resistive element using the accumulation effect of the spin current outputs a voltage change signal with a magnetic field change signal generated from a recording medium.

The conventional general standpoint is that the spin information of the current that flows into metal is 100 nm at the maximum and attenuates to zero.

However, it is proved that a phenomenon that a magneto resistive interaction occurs in the electric conduction when the spin information exceeds 500 nm. It is being theoretically proved that this phenomenon is derived from the spin accumulation. The spin accumulation is that when a current flows through an interface between the magnetic material and the nonmagnetic material, a spin polarization current stays in the vicinity of the interface as a boundary, and the spin polarization current is accumulated over a large region within the nonmagnetic material. Therefore, it is possible to provide a magnetic reproducing head structure with the provision of mechanisms that magnetically operate such as a fixed layer and a free layer of the normal TMR film on the ferromagnetic electrodes, respectively.

That is, a structure is made that the magnetization of at least one ferromagnetic electrode layer among the four ferromagnetic electrode layers is reversed. In the structure, there are realized cases in which the direction of magnetization of the respective ferromagnetic electrode layer pairs that structure the current terminals and the voltage measurement terminals are in parallel and in anti-parallel. The magnetic film at a side where the magnetization is fixed acts as a fixed layer in a spin valve structure. Also, another magnetic film acts as a free layer.

In fact, in the above structure, the magnetic film at the side where the magnetization is fixed can be realized by fixing the magnetization by using a exchange coupling due to one way anisotropy of the anti-ferromagnetic material. Alternatively, the magnetic film can be realized by adjusting the thickness or material of the magnetic film at the fixed layer side so as to make the coercive force larger than that of the magnetic material at the free layer side.

Figure 10:
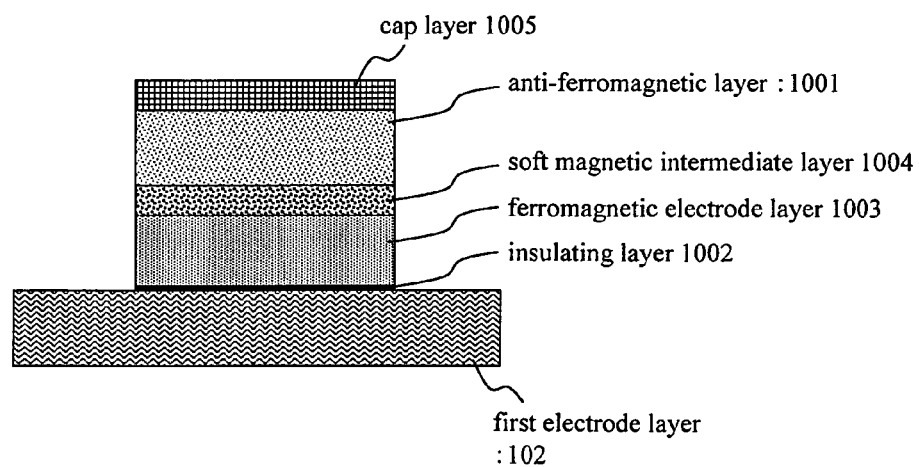
FIG. 10 is a diagram showing the structure of an antiferromagnetic coupling film.

As shown in FIG. 10, an anti-ferromagnetic layer 1001 is disposed so as to cover the entire surface of the first ferromagnetic electrode layer 104, or to cover only a part of the first ferromagnetic electrode layer 104. A structure is effective in which an NiFe or Co soft magnetic intermediate layer 1004 which is about 1 to 5 nm is interposed between the generalized ferromagnetic electrode layer 1003 and anti-ferromagnetic film 1001.

As the film that structures the anti-ferromagnetic layer 1001, PtMn, CrMnPt, MnIr, NiO or PdPtMn is effective in fixing of the magnetization due to one way coupling magnetic field with respect to the ferromagnetic electrode layer 1003. This is because each component sufficiently largely exhibit one way anisotropy through a heat treatment in the magnetic field when each component is equal to or more than a critical thickness which is determined in each composition of several nm to several tens nm, and is under an appropriate condition. All of the structures where the anti-ferromagnetic material is stacked are applicable to the second and third ferromagnetic electrode layers so as to fix the magnetization, likewise.

Also, with the application of a material high in spin polarizability such as half-metal to the magnetic material, it is possible to increase the polarizability of the spin polarization current, and to further strengthen the magnetic interaction. In the present specification, the "half-metal" means a material where an electron structure on a Fermi surface of the material is made up of only one spin of the upper and lower spins by substantially 100%. Also, the "polarizability P" means the polarization of spin. Assuming that the number of upward spin electrons on the Fermi surface is $n\uparrow$, the number of downward spin electrons on the Fermi surface is $n\downarrow$, the polarizability P is defined by the following expression:

$$P=100\times(n\uparrow-n\downarrow)/(n\uparrow+n\downarrow)$$

When electrons flows in the half metal, the electrons of the spin component in the same direction as that of the electron spin on the Fermi surface of the half metal are saved and conduct in the half metal. On the contrary, the electrons having the spin in the reverse direction cannot conduct in the half metal because a repulsive force is exerted.

In the case where a layer made of a half metal is inserted into at least one of the four ferromagnetic electrode layers, electrons that penetrate a half-metal layer come to a state in which the spin polarizability is very high. In case of an ideal half metal, since an electron state on the Fermi surface is subjected to spin polarization by substantially 100%, a current that penetrates the Fermi surface has the spin polarizability of nearly 100%. The actually known polarizability of the half metal at room temperature is 50% to 90%. This is because a resistance of the half metal with respect to a current having the reversed spin components is substantially infinite, the electrons of the reversed spin are scattered, and only one-side spin conducts while a scattering length is long.

When the above high spin polarization current is effectively injected into the conductive material from the above-mentioned magnetic layer, the polarizability of the spin electrons that are accumulated in the conductive material increases, and the magnetic interaction is strengthened. As a result, the magnitude of the potential change $\Delta V$ depending on the magnetic field which occurs at the free layer side becomes very large.

The half-metal film is frequently higher in electric resistance than a metal film. Therefore, when the normal element is applied for high recording density, it is frequently difficult to lower the resistance. However, in the present invention, the structure that obtains an output as a sensor is located at a portion different from the magneto resistive structure. Therefore, there is advantageous in that the material is selective so that a design for applying the half metal is readily conducted.

The above half-metal magnetic material is roughly classified into (A) a magnetic semiconductor and (B) a partial oxide magnetic material. (A) The magnetic semiconductor is a compound having a blende crystal structure such as CrAs or CrSb, or a dilute magnetic semiconductor (InMnAs, GaMnAs) where III-V group compound semiconductor having the same crystal structure is doped with a magnetic material such as Mn. The magnetic semiconductor is fabricated by a single crystal epitaxial growth due to MBE.

In general, in those magnetic semiconductors, a temperature at which the half-metal characteristics are exhibited is in a low temperature region of 100 K to 4 K or less. Exceptionally, there are magnetic semiconductors such as CrSb (to 350 K) or CrAs (Tc>1000 K), which exhibit the half-metal characteristics even at a high temperature. CrAs has the blende crystal structure. However, CrAs is very high in Tc in calculation based on the first principle as described above. Moreover, it has been experimentally confirmed that a film of CrAs which is about 1 nm in thickness has the ferromagnetic and half-metallic characteristics at room temperature.

Some of the magnetic semiconductor where ZnO or GaN is doped with a transition metal or the magnetic semiconductor having the blende crystal structure may exhibit the ferromagnetic action at room temperature and can be called "half metal".

On the other hand, as the oxide magnetic material of (B), $Fe_3O_4$ has been particularly well known. $CrO_2$ may be selected as a half-metal material other than $Fe_3O_4$. $Fe_3O_4$ is important because the half-metal characteristic is obtained even at room temperature, and magnetization is large and the soft magnetic characteristic is obtained as the magnetic material. However, a high-temperature treatment that exceeds 500° C. or the formation of a film at a substrate temperature is generally required in order to obtain a single layer film. For that reason, $Fe_3O_4$ has not been put in practical use.

As described above, the oxide half-metal material suffers from a serious problem associated with the manufacturing temperature, and therefore the oxide half-metal material has not yet been structured into an element or an actual magnetic head. In addition, in case of $Fe_3O_4$, there is a phase of $Fe_2O_3$ which is a composition similar to $Fe_3O_4$. $Fe_2O_3$ is a stable phase but low in magnetization and not half metal. $Fe_3O_4$ is liable to be mixed in phase with $Fe_2O_3$, and Fe and $Fe_3O_4$ are liable to be mixed in phase with each other. CrO2 is also liable to be mixed in phase with an insulating material of $Cr_2O_3$. Therefore, a specific fabricating method such as a high-temperature fabrication in an oxygen atmosphere is required.

To solve the above problem, a growth energy is adjusted by selecting a ground material of $Fe_3O_4$, thereby being capable of providing a single layer. As such a material, Pt, Rh and Cu which are partial noble metal, or TiN of compound is effective. The single film can be fabricated in such a manner that those films are formed on the substrate through an RF sputtering technique, and $Fe_3O_4$ is formed on those films.

In the above manner, when the film is formed at the substrate temperature of 300° C., $Fe_3O_4$ of a single layer has been confirmed from the measurement of an X-ray diffraction pattern. Also, it has been confirmed that saturation magnetization at room temperature is 0.55 to 0.6 tesla from the measurement using VSM, which is the same value as that of $Fe_3O_4$ of a bulk (saturation magnetization: 0.5 to 0.6 tesla (at room temperature)).

In addition, a temperature dependent abnormality (Verwey point) at substantially 120 K which is the feature of $Fe_3O_4$ can be also confirmed by the electric resistance measurement of a single film. The same is substantially applied when the substrate temperature is 250° C. or higher. Therefore, it is considered that an $Fe_3O_4$ single film can be formed in the above manner. Moreover, it is possible to thin the film to several nm.

Accordingly, the half material can be made of the following material. That is, an oxide having a structure of $AB_2O_4$ represented by $Fe_3O_4$ where A is oxide containing at least one of Fe, Co and Zn, and B is oxide containing one of Fe, Co, Ni, Mn and Zn;

a compound of $CrO_2$, CrAs, CrSb or ZnO added with at least one component of Fe, Co, Ni, Cr and Mn which are transition metal;

a compound of GaN added with Mn; or a Heusler alloy that contains $C_2D_xE_{1-x}F$ type Heusler alloy represented by $Co_2MnGe$, $Co_2MnSb$, or $Co_2Cr_{0.6}Fe_{0.4}Al$ where C is at least one of Co, Cu and Ni, D and E are one of Mn, Fe and Cr, respectively, and F contains at least one component of Al, Sb, Ge, Si, Ga and Sn.

The first to fourth insulating layers 103, 105, 107 and 109 shown in FIG. 1 may be made of a single layer film using $Al_2O_3$, AlN, $SiO_2$, $FfO_2$, $Zr_2O_3$, $Cr_2O_3$, MgO, $TiO_2$ or $SrTiO_3$, which are an insulating barrier layer material used in TMR, or a single layer or a laminate film which is formed of a film containing at least one of those materials. This is because electron transfer that is attributable to the tunnel effect is low in the loss of spin information, and the voltage change output is liable to be obtained.

It is necessary that the first electrode layer 102 is low in resistance and nonmagnetic. Therefore, a nonmagnetic conductive metal such as Cu, Au, Ag, Pt, Al, Pd, Ru, Ir or Rh, and a conductive compound such as GaAs or Si are effective. In addition, it is considered that a compound of d-electron conductivity which mainly TiN, TiO or $ReO_3$ having d-electrons which are magnetic electrons on the Fermi surface is particularly effective because the dissipation of spin information which is derived from energy transition from d-electrons to s-electrons is prevented.

Also, in the case where the first electrode layer 102 is made of Al, the spin accumulation effect is enhanced when the longest length is shorter than the spin diffusion length 550 nm.

Figure 11:
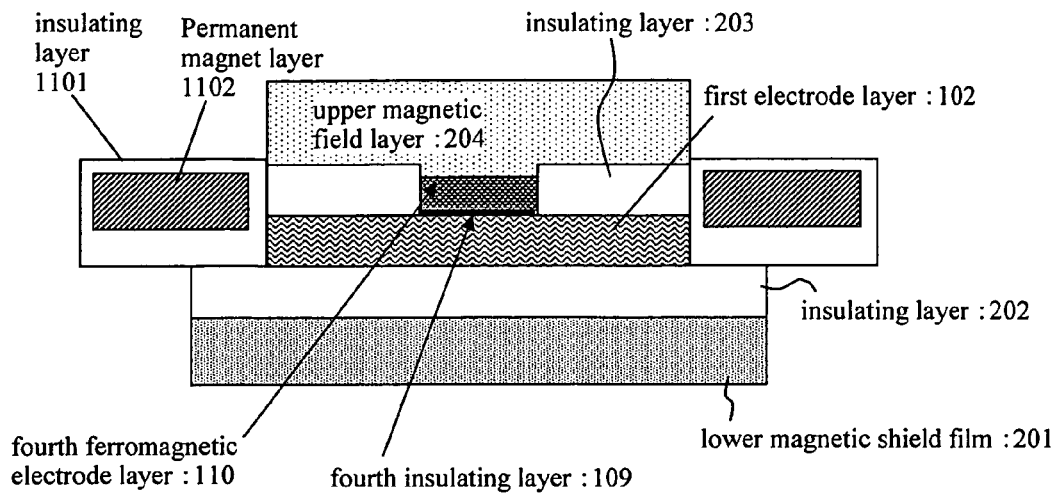
FIG. 11 is an explanatory diagram of a magnetic domain control system in a hard bias.

In the case where a hard bias system applied to the general GMR reproducing head is applied to a magnetic domain control of the ferromagnetic electrode layer, particularly the fourth ferromagnetic electrode layer as shown in FIG. 11, permanent magnets 1102 used for the hard bias are disposed on both end portions of the element film 110 through insulating films 1102 in a widthwise direction of a track. With this structure, fine magnetic domains that occur at the end portions of the ferromagnetic electrode layer 110 in the element are reduced by means of a leakage magnetic flux from the permanent magnet 1102. This makes it possible to form a magnetic domain structure aligned in one direction.

Figure 12:
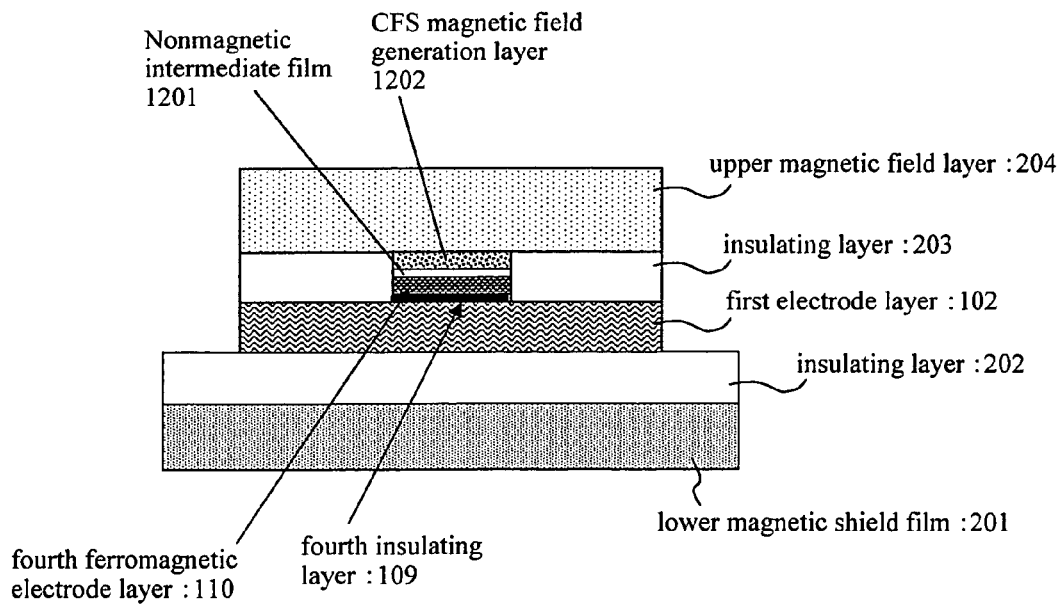
FIG. 12 is an explanatory diagram of the magnetic domain control system in CFS.

In addition, a CFS (closed flux structure) magnetic field generation layer 1202 that is formed of the permanent magnet layer 1102 is attached onto the other main surface of the ferromagnetic electrode layer 110 through a nonmagnetic intermediate film 1201 as a new magnetic domain control system, as shown in FIG. 12. Also, a multiplayer film formed of a soft magnetic film that is in contact with the anti-ferromagnetic film is additionally formed on the other main surface of the ferromagnetic electrode layer 110 as a material of the CFS magnetic field generation layer 1202. With this structure, it is possible to effectively realize a CFS which aligns the magnetic domains of the ferromagnetic electrode layer 110 by means of the leakage magnetic flux generated from the permanent magnet or the end portion of the soft magnetic film.

Also, the configuration magnetic anisotropy of the element is changed by changing a ratio of the track widthwise length of the configuration of the ferromagnetic electrode layer 110 to the length of the heightwise direction of the element. This structure makes it possible to adjust the coercive force or the concurrent rotation of magnetization. To the extent that the element size is lower than 0.1 μm×0.1 μm, it is predicted that the insulation of the insulating film of the hard bias and a precision of the magnetic domain control magnetic field are remarkably deteriorated. In a region where the gap interval is lower than 50 nm, the thinning of the film becomes an issue. However, this system is probable as a future system and sufficiently effective for the film structure of the present invention.

EXAMPLE 1

A film is formed on a substrate usually used such as an $SiO_2$ substrate or a glass substrate (including a magnesium oxide substrate, a GaAs substrate, an AlTiC substrate, an SiC substrate or An $Al_2O_3$ substrate or the like) by means of a film forming device such as an RF sputtering method, a DC sputtering method, or a molecular beam epitaxy method (MBE). For example, in case of the RF sputtering method, in a device using a 3-inch target, a predetermined film is grown in an Ar atmosphere with a pressure of about 1 to 0.05 Pa and a power of 50 W to 150 W. The above-mentioned substrate is directly used, or an insulating film, or a proper ground metal film formed on the substrate is used as a base substrate that forms the element.

After the formation of a lower shield film and an insulating film have been formed on the base substrate that forms the element in high vacuum, an Al film is formed in thickness of 1 nm on the insulating film. Thereafter, the configuration of the first electrode layer is drawn though an electron beam drawing method and then milled. Then, the Al film is naturally oxidized in an oxygen atmosphere. The oxidation of the Al film is performed by using an oxidation process such as plasma oxidation or ozone oxidation instead of the natural oxidation, likewise. After the oxidation process, a ferromagnetic film that is 5 nm to 20 nm in thickness is formed on the Al film. A Ta film or the like is formed on the ferromagnetic film as a protective film as the case may be. An insulating film made of $Al_2O_3$ or $SiO_2$ may be formed on the Al film before the ferromagnetic film is prepared. Then, a resist is coated on the film, and a configuration of the resist is drawn through a lithography using an I-ray stepper and the electron beam drawing method.

The film is milled and patterned. Thereafter, a junction portion is drawn to form a junction. In this process, after an insulating film made of $Al_2O_3$ or $SiO_2$ has been formed on a peripheral portion by a liftoff pattern using a two-stage resist or the like, liftoff is conducted. In the fabrication, the electron beam drawing, the sputtering method or a probe drawing method is used. Also, a process for removing a burr that is generated after ion milling or dry etching is conducted. In the case where a hard bias film of a free layer is fabricated, after the insulating film has been formed, a film made of CoCrPtZr that is a permanent magnet is fabricated, and an insulating film is further formed. Thereafter, drawing for forming the ferromagnetic electrode is conducted, and a surface cleaning process is then conducted. Thereafter, a soft magnetic film made of Co and NiFe and an anti-ferromagnetic film made of MnIr are formed on the cleaned surface.

FIGS. 13 and 14 show views of the structure shown in FIG. 1, viewed from a surface that faces a medium in which the respective layers of the element that has been fabricated actually are exploded. For example, the first electrode layer 102 which is made of Al and about 500 nm in width, and the first, second, third and fourth ferromagnetic electrode layers that is made of Co are in contact with the first to fourth insulating layers by $Al_2O_3$.

The first ferromagnetic electrode layer is disposed between the fourth and third ferromagnetic electrode layers in a direction of height of the element and at the substantially same distances from those two ferromagnetic electrode layers. Also, the second ferromagnetic electrode layer is disposed at the substantially same element level as the first ferromagnetic electrode layer and at the substantially same distance from those two fourth and third ferromagnetic electrode layers. A current source that allows a current to flow is connected to the first ferromagnetic electrode layer and the second ferromagnetic electrode layer. With this structure, the third ferromagnetic electrode layer is electrically grounded and connected to a mechanism that measures a voltage change which is caused by the magnetization reversal of the fourth ferromagnetic electrode layer. In addition, a magnetic shield formed of the soft magnetic film is disposed on the lower layer that forms the base substrate of those elements and the front surface side of the film through the insulating film. A magnetic head with the structure where a recording head is positioned is formed on the upper shield.

In the case where an area of the first electrode film is 500 nm×500 nm, a potential difference V that is developed between the fourth and third ferromagnetic electrode layers is about 90 mV at room temperature when a current that flows between the first and second ferromagnetic electrodes is 100 µA. The potential is about 10 times as large as the output that is recognized in the case of using a nonmagnetic thin line.

Also, the voltage is a very low value when the magnetic field is zero, and is a high value of 100 to 1000% as a rate of change which is attributable to the magnetic field. Moreover, the output and the rate of change can be increased by reducing the area of the first electrode film, increasing the current, selecting a material such that a material high in spin polarization is applied to the ferromagnetic electrode, or lowering the temperature.

EXAMPLE 3

In the case of applying a half-metal material to those magnetic films, when $Fe_3O_4$ is formed, an $Fe_3O_4$ film which is 0.4 tesla or more in saturation magnetization can be fabricated on a film that is 50 nm or less in thickness at a substrate temperature of 250° C. or higher through a novel fabricating method. In the novel fabricating method, $H_2O$ fraction of the sputtering chamber atmosphere is reduced, and the film is formed at a low rate and with a low energy.

The fact that $Fe_3O_4$ has the half-metallic characteristic has been known from the theoretical verification based on the first principle calculation, the past spectrographic analysis or the like. The saturation magnetization Bs of the formed $Fe_3O_4$ film becomes 0.4 tesla or more by setting the surface roughness Ra of the ground film to 0.4 nm or less, and an excellent $Fe_3O_4$ growth is recognized. In this example, the ground film may be formed of a conductive metal or alloy film such as Pt, Cu, Pd, Rh, Ru, Ir, Au, Ag, Ta, CoFe, Co or NiFe, or a conductive compound film such as TiN. Also, an appropriate ground film made of Cr, Ta, or NiFeCr is inserted under the noble metal by several nm to several tens nm. With this structure, the surface structure of the noble metal film that has been grown on the ground film is smoothed, and the growth of the $Fe_3O_4$ film is accelerated.

As in case of $Fe_3O_4$ described above, the ground noble metal film is formed, and $CrO_2$, ZnO or GaN which is a half-metal oxide material other than $Fe_3O_4$ is then grown on the ground noble metal film. As a result, it is recognized that a single, layer film is formed even at the substrate temperature of 250° C. ZnO becomes in a state of the ferromagnetic half metal with being doped with the ferromagnetic metal of V, Cr, Fe, Co or Ni by about 25%. Also, GaN becomes the ferromagnetic half metal when GaN is formed on the GaAs ground film with being doped with Mn by 25% using MBE.

Also, it is possible to fabricate the film in a method in which a target corresponding to a composition such as $Co_2MnGe$, $Co_2MnSb$ or $Co_2Cr_{0.6}A_{10.4}Mn$ which is a compound called "Heusler alloy" is grown directly on the substrate through the RF sputtering in the Ar atmosphere. The substrate temperature is 300° C. or higher, and a heat treatment of 700° C. or higher is desirably conducted. However, it is possible to obtain a regularized structure even in the case where the target is formed on a room-temperature substrate, and a heat treatment is conducted at 270° C. for a long period of time. Also, it is necessary to identify the composition confirmation of the fabricated film through the XPS or ICP analysis because a relationship between the composition of the fabricated film and the composition of the target is liable to deviate.

The use of the above films for the magnetic layer increases the output $\Delta V$ as the magneto resistive element about several times, and is effective for simplification of the design of the element.

EXAMPLE 4

Figure 15:
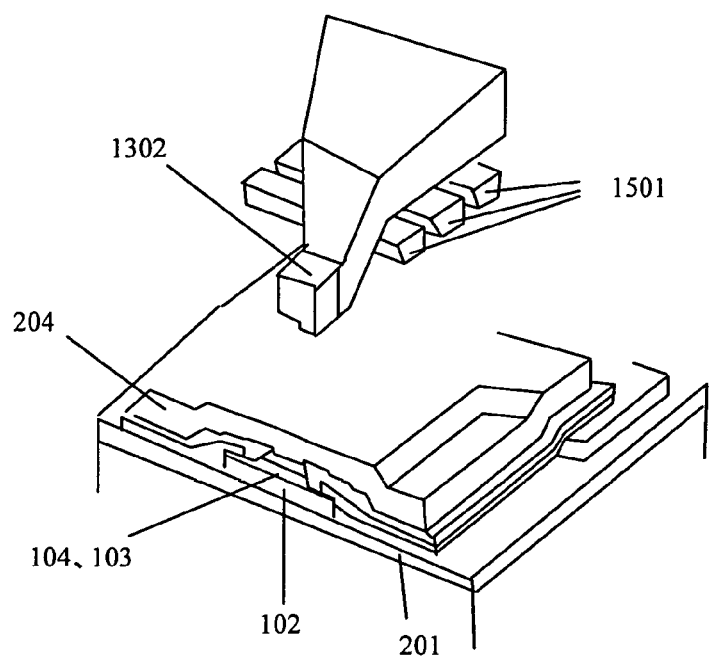
FIG. 15 is a schematic diagram showing a positional relationship between a magneto resistive effect element and a recording head according to the present invention.

FIG. 15 is a schematic diagram showing the structure of a magnetic reproducing head including a recording head. The reproducing head structure described above is disposed between the upper and lower shields 201 and 204, and the magnetic film 104 that forms a basic structure appears on an ABS surface that faces a medium. As shown in the figure, a magnetic pole 1302 and a coil 1501 that induces the magnetization of the magnetic pole 1302 are provided. The shield configuration is of a parallel plane type. However, a shield having a box shield configuration so as to surround both sides of the film 102 which is the reproducing mechanism, or the film 104 on the film 102 is effective because the resolution in the track widthwise direction can be improved.

As the material of the magnetic pole, a CoFe material having a high saturation magnetic flux density is used in the conventional type. In recent years, a recording system using a material having a higher saturation magnetic flux density is advanced. The reproducing system according to the present invention effectively acts on a vertical magnetic recording or in-plane magnetic recording which is realized by using the above material.

Also, the reading system is effective for the recording head with a mechanism in which a light whose size is narrowed is irradiated onto a medium to locally increase a medium temperature, and the magnetization is reversed by means of the action of magnetization reduction which is attributable to an increase in the temperature of the medium as the recording system.

Figure 16:
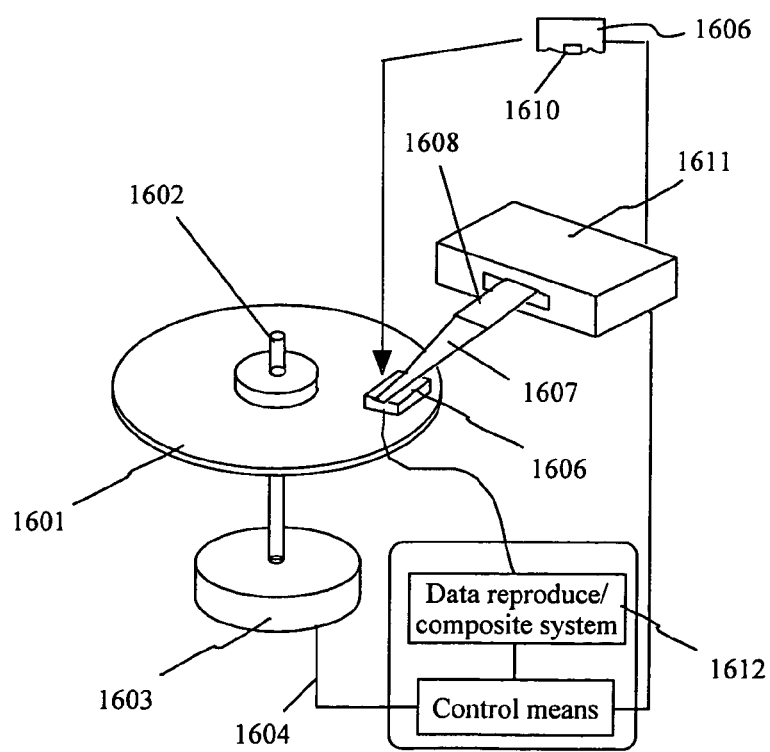
FIG. 16 is a schematic diagram showing a magnetic recording device according to the present invention.

FIG. 16 is a diagram showing one example of a magnetic disk device using the head of the present invention. The magnetic disk device shown in the figure is made up of a magnetic disk 1601 as a magnetic recording medium shaped in a disk, for recording data in a recording region which is called "concentric tracks", and a magnetic head 1610 of the present invention, which is formed of a magnetic transducer for implementing reading and writing of the data. The magnetic disk device is also made up of an actuator means 11611 that moves the magnetic head 1610 to a predetermined position on the magnetic disk 1601, and a control means that controls the transmission and reception of the data to be written and the movement of the actuator means.

The structure and operation will be described below. At least one rotatable magnetic disk 1601 is supported by a rotary shaft 1602 and rotated by a driving motor 1603. At least one slider 1606 is located on the magnetic disk 1601, and the one or more sliders 1606 are disposed to support the magnetic head 1610 of the present invention for reading and writing data.

The slider 1606 is moved to the disk surface while the magnetic disk 1601 rotates with the result that the slider 1606 is accessed to a given position where data in question is recorded. The slider 1606 is attached to an arm 1608 by a suspension 1607. The suspension 1607 has a slight elasticity, and the slider 1606 is brought into close contact with the magnetic disk 1601. The arm 1608 is attached to the actuator 1611.

There is provided a voice coil motor (hereinafter referred to as "VCM") as the actuator 1611. VCM is formed of a movable coil located in a magnetic field. The moving direction and moving velocity of the coil are controlled according to an electric signal which is supplied from a control means 1612 through a line 1604. Accordingly, the actuator means according to this example is made up of, for example, the slider 1606, the suspension 1607, the arm 1608, the actuator 1611 and the line 1604.

During the operation of the magnetic disk, an air bearing derived from airflow occurs between the slider 1606 and the disk surface by the rotation of the magnetic disk 1601. The air bearing floats the slider 1606 from the surface of the magnetic disk 1601. Accordingly, during the operation of the magnetic disk device, the air bearing is balanced with the slight elasticity of the suspension 1607, and the slider 1606 is so maintained as to float at a given interval with the magnetic disk 1601 without contact with the magnetic disk surface.

Normally, the control means 1612 is made up of a logic circuit, a memory, a microprocessor, etc. The control means 1612 transmits and receives a control signal through the respective lines, and also controls various structural means of the magnetic disk. For example, the motor 1603 is controlled according to a motor drive signal that is transmitted through the line 1604.

The actuator 1611 is so controlled as to optimally move and position the selected slider 1606 to a data track in question on the related magnetic disk 1601 according to a head position control signal and a seek control signal.

Then, the control means receives and decodes the electric signal resulting from reading and converting data of the magnetic disk 1601 by the magnetic head 1610 through the line 1604. Also, the control means transmits the electric signal to be written on the magnetic disk 1601 as data to the magnetic head 1610 through the line 1604. That is, the control means 1612 controls the transmission and reception of information to be read or written by the magnetic head 1610.

It is possible to transmit the signal to be read or written directly from the magnetic head 1610. Also, as the control signal, there are, for example, an access control signal and a clock signal. In addition, it is possible that the magnetic disk device has a plurality of magnetic disks and actuators, and the actuator has a plurality of magnetic heads. In the above example, the disk-shaped medium rotates and the head accesses as shown in the figure. Otherwise, the same effect is obtained even with a mechanism in which a large number of heads scan the fixed medium concurrently.

With the provision of the above plurality of mechanism, a so-called disk array device can be formed.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A magnetic head, comprising:
   a first electrode layer;
   a first ferromagnetic electrode pair having a first ferromagnetic electrode layer that is stacked on one end of the first electrode layer through a first insulating layer, and a second ferromagnetic electrode layer that is stacked on the other end of the first electrode layer through a second insulating layer; and
   a second ferromagnetic electrode pair having a third ferromagnetic electrode layer that is stacked on one end of the first electrode layer through a third insulating layer, and a fourth ferromagnetic electrode layer that is stacked on one end of the first electrode layer through a fourth insulating layer;
   wherein the second ferromagnetic electrode pair intersects with a current that flows between the first ferromagnetic electrode pair;
   wherein the current is allowed to flow between the first ferromagnetic electrode pair through the first electrode layer to accumulate spin electrons in the first electrode layer;
   wherein a direction of magnetization of the fourth ferromagnetic electrode layer changes upon application of an external magnetic field; and
   wherein a coercive force of the fourth ferromagnetic electrode layer is smaller than a coercive force of the first and third ferromagnetic electrode layers.

2. A magnetic head, comprising:
   a first electrode layer;
   a first ferromagnetic electrode pair having a first ferromagnetic electrode layer that is stacked on one end of the first electrode layer through a first insulating layer, and a second ferromagnetic electrode layer that is stacked on the other end of the first electrode layer through a second insulating layer; and
   a second ferromagnetic electrode pair having a third ferromagnetic electrode layer that is stacked through a third insulating layer on one end of the first electrode layer, which is different from portions of the first electrode layer which are electrically connected with the first and second ferromagnetic electrode layers, and a fourth ferromagnetic electrode layer that is stacked through a fourth insulating layer on the other end of the first electrode layer, which is electrically connected with the third ferromagnetic electrode layer;

wherein a current is allowed to flow between the first ferromagnetic electrode pair through the first electrode layer to accumulate spin electrons in the first electrode layer;

wherein a direction of magnetization of the fourth ferromagnetic electrode layer changes upon application of an external magnetic field; and wherein a coercive force of the fourth ferromagnetic electrode layer is smaller than a coercive force of the first and third ferromagnetic electrode layers.

3. The magnetic head as claimed in claim 1 or 2, wherein the first ferromagnetic electrode pair is connected to a constant current circuit as a current terminal, a direction of the applied magnetic field is not substantially identical with a direction along which the current flows in the first electrode layer through the ferromagnetic electrode pair.

4. The magnetic head as claimed in claim 1 or 2, wherein in an arrangement of the ferromagnetic electrode layers of the second ferromagnetic electrode pair on the first electrode layer, distances between substantially center portions of the respective surfaces where the third and fourth ferromagnetic electrode layers are in contact with the first electrode layer and a substantially center portion of a surface where the first ferromagnetic electrode layer is in contact with the first electrode layer are substantially identical with each other.

5. The magnetic head as claimed in claim 1 or 2, wherein in an arrangement of the ferromagnetic electrode layer of the second ferromagnetic electrode pair on the first electrode layer, the respective surfaces where the four ferromagnetic electrode layers and the first electrode layer are arranged on the same surface of the first ferromagnetic electrode layer, the fourth ferromagnetic electrode layer are in contact with films of upper and lower shields, respectively, and the upper and lower shields are isolated from the first electrode layer and the ferromagnetic electrode layers with insulating layers except for the contact portions of the fourth ferromagnetic electrode layer with the films of the upper and lower shields.

6. The magnetic head as claimed in claim 1 or 2, wherein in an arrangement of the ferromagnetic electrode layers of the second ferromagnetic electrode pair on the first electrode layer, the respective surfaces where the four ferromagnetic electrode layers are in contact with the first electrode layer have a structure in which the fourth ferromagnetic electrode layer is arranged on one surface of the first ferromagnetic electrode layer, the second and third ferromagnetic electrode layers are arranged on a rear surface of the first ferromagnetic electrode layer, the fourth ferromagnetic electrode layer is in contact with one of the films of the upper and lower shields, and the second ferromagnetic electrode layer is arranged on the same surface of the first ferromagnetic electrode layer as the fourth ferromagnetic electrode layer or the rear surface of the first ferromagnetic electrode layer, and the upper and lower shields are isolated from the first electrode layer and the ferromagnetic electrode layers with insulating layers except for the contact portions.

7. The magnetic head as claimed in claim 1 or 2, wherein all of the first to third ferromagnetic electrode layers arranged on the first electrode layer, or at least the first and third ferromagnetic electrode layers have entire surfaces or at least the contact surface portions which are in contact with the first electrode layer are in direct contact with a film of an anti-ferromagnetic material, or in contact with the film of the anti-ferromagnetic material through a ferromagnetic metal film.

8. The magnetic head as claimed in claim 1 or 2, wherein the fourth ferromagnetic electrode layer disposed on the first electrode layer has a length in a direction orthogonal to a medium surface which is longer than a length in a direction parallel with the medium surface.

9. The magnetic head as claimed in claim 1 or 2, wherein in the fourth ferromagnetic electrode layer disposed on the first electrode layer, a magnetic domain structure is aligned by one of a structure in which permanent magnet layers are disposed on both ends of the fourth ferromagnetic electrode layer through insulating layers, and magnetization of the fourth ferromagnetic electrode layer is fixed by a leakage magnetic flux from the both ends of the fourth ferromagnetic electrode layer, and a structure in which a nonmagnetic film is disposed on the other main surface side of the fourth ferromagnetic electrode layer, a permanent magnet film or a multiplayer film including an anti-ferromagnetic film and a magnetic film is in contact with the other main surface side of the fourth ferromagnetic electrode layer, and magnetization of the fourth ferromagnetic electrode layer is fixed by a magnetic flux from the both ends of the fourth ferromagnetic electrode layer.

10. The magnetic head as claimed in claim 1 or 2, wherein a part of the fourth ferromagnetic electrode layer disposed on the first electrode layer is exposed to a surface that faces a medium surface.

11. The magnetic head as claimed in claim 1 or 2, wherein a part of the fourth ferromagnetic electrode layer disposed on the first electrode layer is not exposed to a surface that faces a medium surface, and disposed through a protective film.

12. The magnetic head as claimed in claim 1 or 2, wherein the first electrode layer is made of good conductor metal and compound of Al, Pt, Au, Ag, Pd Cu or TiN, or semiconductor material mainly containing Si, GaAs or As, or Sb.

13. The magnetic head as claimed in claim 1 or 2, each of the first to fourth ferromagnetic electrode layers is formed of a single layer film or a composite multiplayer film containing:

ferromagnetic metal of Co, Fe or Ni, or ferromagnetic alloy mainly containing Co, Fe or Ni;

an oxide having a structure of $AB_2O_4$ where A is oxide containing at least one of Fe, Co and Zn, and B is oxide containing one of Fe, Co, Ni, Mn and Zn;

a compound of $CrO_2$, CrAs, CrSb or ZnO added with at least one component of Fe, Co, Ni, Cr and Mn which are transition metal;

a compound of GaN added with Mn; or a $C_2D_xE_{1-x}F$ type Heusler alloy where C is at least one of Co, Cu and Ni, D and E are one of Mn, Fe and Cr, respectively, and F contains at least one component of Al, Sb, Ge, Si, Ga and Sn.

14. The magnetic head as claimed in claim 1 or 2, wherein each of the first to fourth insulating layers is formed of a single layer film or a composite multi-layer film which mainly contains $Al_2O_3$, AlN, $HfO_2$, $SrTiO_3$, $Cr_2$, $O_3$, $ZrO_2$, $SiO_2$, or MgO.

* * * * *